(12) United States Patent
Takenouchi

(10) Patent No.: US 9,283,498 B2
(45) Date of Patent: *Mar. 15, 2016

(54) DEFOAMING METHOD AND DEVICE

(75) Inventor: Ken Takenouchi, Yokohama (JP)

(73) Assignee: TOYO SEIKAN KAISHA, LTD., Tokyo (JP)

( * ) Notice: Subject to any disclaimer, the term of this patent is extended or adjusted under 35 U.S.C. 154(b) by 974 days.

This patent is subject to a terminal disclaimer.

(21) Appl. No.: 13/503,565

(22) PCT Filed: Oct. 22, 2010

(86) PCT No.: PCT/JP2010/068676
§ 371 (c)(1),
(2), (4) Date: Apr. 23, 2012

(87) PCT Pub. No.: WO2011/052496
PCT Pub. Date: May 5, 2011

(65) Prior Publication Data
US 2012/0208901 A1   Aug. 16, 2012

(30) Foreign Application Priority Data
Oct. 27, 2009   (JP) .................................. 2009-246726

(51) Int. Cl.
*B01D 19/02* (2006.01)
*B65B 3/22* (2006.01)

(52) U.S. Cl.
CPC .. *B01D 19/02* (2013.01); *B65B 3/22* (2013.01)

(58) Field of Classification Search
CPC ............... B01D 19/02; B01D 19/0073; B01D 19/0078; B01J 19/08; B65B 3/22; B67C 3/00; B67C 3/22; B67D 1/1422; G10K 15/046; H01S 3/00

USPC ............ 516/115; 95/242; 96/175; 204/158.2; 422/127, 186.07; 210/748.02, 748.06
See application file for complete search history.

(56) References Cited

U.S. PATENT DOCUMENTS 4,608,979 A * 9/1986 Breidenthal et al. ............... 601/4
6,190,713 B1 * 2/2001 Babel ...................... B67C 3/222
426/232

(Continued)

FOREIGN PATENT DOCUMENTS

JP    53-102178 U    1/1976
JP    60-031306 U    3/1985

(Continued)

OTHER PUBLICATIONS

International Search Report of PCT/JP2010/068676, mailing date Dec. 21, 2010.

Primary Examiner — Daniel S Metzmaier
(74) Attorney, Agent, or Firm — Westerman, Hattori, Daniels & Adrian, LLP

(57) ABSTRACT

Provided are a deforming method and device that use laser-induced breakdown. The provided method and device make it possible to shorten the focal distance, thereby improving laser beam convergence, and increase the utilization efficiency of sound waves that contribute to defoaming. Pulsed laser light is focused and irradiated into a space inside an acoustic waveguide (4), thereby generating pulsed sound waves from the illumination point (7). The pulsed sound waves propagate down the acoustic waveguide as plane waves, then propagate beyond an open end (16) as spherical waves, and break up a foam outside the open end of the acoustic wave guide.

12 Claims, 5 Drawing Sheets

(56) References Cited

U.S. PATENT DOCUMENTS

| | | | |
|---|---|---|---|
| 6,694,705 B1* | 2/2004 | Frei et al. | 53/428 |
| 8,026,288 B2* | 9/2011 | Takenouchi et al. | 516/115 |
| 8,329,764 B2* | 12/2012 | Takenouchi et al. | 516/115 |
| 2005/0131289 A1* | 6/2005 | Aharoni et al. | 600/407 |
| 2007/0089606 A1* | 4/2007 | Cullen et al. | 95/241 |
| 2009/0020412 A1 | 1/2009 | Takenouchi et al. | |
| 2011/0272060 A1* | 11/2011 | Clusserath | 141/11 |
| 2011/0306681 A1* | 12/2011 | Takenouchi et al. | 516/115 |
| 2013/0327217 A1* | 12/2013 | Tatsumi et al. | 95/242 |

FOREIGN PATENT DOCUMENTS

| | | |
|---|---|---|
| JP | 62-90397 U | 6/1987 |
| JP | 63-104620 A | 5/1988 |
| JP | 63-252509 A | 10/1988 |
| JP | 06-191595 A | 7/1994 |
| JP | 07-291395 A | 11/1995 |
| JP | 09-328193 A | 12/1997 |
| JP | 11-090330 A | 4/1999 |
| JP | 2002-520226 A | 7/2002 |
| JP | 2007-086339 A | 4/2007 |
| WO | 00/02781 A1 | 1/2000 |
| WO | 2007/086339 A1 | 8/2007 |

* cited by examiner

DEFOAMING METHOD AND DEVICE

TECHNICAL FIELD

The present invention relates to a defoaming method and defoaming device suitable for defoaming foam on a liquid surface, in particular, destroying foam generated when a container, such as a can, a PET bottle, a bottle can and a pouch, is filled with a liquid, such as a beverage.

BACKGROUND ART

In a filling process of producing packaged beverages (canned beverages, beverages in PET bottles, bottled beverages), a beverage is typically flowed from above into a container disposed vertically in a filling machine, then the container is joined to a lid member and sealed in a sealing machine (a seaming machine, a capper and the like). In order to maintain the beverage quality and to improve flavor, it is important to reduce the amount of residual oxygen in the sealed container. The removal of oxygen from the head space inside the container is especially important. A deoxidation technique, such as undercover gas displacement, performed immediately prior to sealing has been developed, is used to realize such removal. On the other hand, because packaged beverages are products consumed in large volume, the rate of the filling process has been increased, and, in the case of canned beverages, high-speed lines capable of producing 1000 to 2000 cans per minute have seen practical use. Following the beverage filling process, foam is generated inside a container. Foam generation behavior and disappearing behavior of the generated foam differ depending on the properties of an individual beverage and the filling conditions, but typically when the production rate is high, a large amount of foam is generated, available time is insufficient to destroy foam, and foam remains during sealing.

Foam contains oxygen at the same concentration level as air, and because the oxygen contained in the foam cannot be removed by gas displacement in the head space, the foam makes it difficult to decrease the amount of oxygen in the head space. In particular, at present since the level of deoxidation technology used for gas displacement has advanced, the remaining oxygen is primarily due to foam. Currently mixing a defoaming agent to a beverage preparation is generally employed to inhibit foam, but because a defoaming agent affects beverage taste, a technology capable of defoaming after filling and before sealing is required.

A method for defoaming by light irradiation has been considered as a means for resolving this problem, and a large number of methods and devices related to this technology have been suggested (see, for example, Patent Documents 1 to 4). Also methods for laser beam irradiation have been suggested. For example, a method for defoaming with laser radiation has been suggested, where intermolecular bonds forming a foam film and organic molecules or water molecules contained in the film are caused to oscillate and are excited by irradiating foam with a laser beam, and the intermolecular bonds are broken down and foam is destroyed (see Patent Document 4).

Methods and devices for defoaming by irradiation with ultrasonic waves have also been suggested (see Patent Documents 5 to 9). Defoaming devices for generating shock waves by arc discharge have also been suggested (see Patent Document 10). Further, in addition to the methods and devices using light, sound and electric discharge, those using heating, microwaves, high frequencies, electric winds, electrostatic charges and vapors have also been suggested.

However with conventional defoaming methods using light irradiation, the defoaming rate is low, and does not match with increased filling speeds. As a result, such methods have not found practical use. These light irradiation techniques are based on the principle of irradiating foam with light energy, heating and evaporating foam components (mostly water), thereby destroying foam. Therefore an individual bubble must be directly irradiated with light energy, and because in general bubbles are distributed over the entire liquid surface, substantial light energy must be supplied to the entire liquid surface to destroy foam by light irradiation. The term "substantial" used herein means that either the light beam diameter is expanded to irradiate the entire surface at the same time, or that the irradiation is performed by scanning the liquid surface with a light beam of a small diameter. In both cases, the total light energy represented by (irradiation power per unit surface area)×(irradiation time)×(irradiation area) is the same. Because time allocated for the defoaming process in the accelerated filling process is short, a sufficient defoaming effect cannot be obtained with a light intensity obtained with a standard light source. Conversely, a high power light source is needed to produce energy sufficient to attain the defoaming effect, and such a light source is impractical.

On the other hand, when defoaming employs irradiation with ultrasonic waves, for example, if defoaming is performed by irradiating with continuous ultrasonic waves generated by an external sound source, because the wavelength of ultrasound is of the same order as the size of the container, that is the irradiation object, the waves lack directivity, irradiation energy is dissipated, and efficiency is poor. As a result, defoaming must be performed over a long distance on a conveyor, and the production line becomes long. Accordingly such an approach is undesirable from the standpoint of saving space. Furthermore in the case of narrow mouth containers, such as PET bottles or bottle cans, it is difficult to transmit light, sound, etc. to the entire liquid surface through the mouth opening, hence there is no effective defoaming means. Another problem associated with conventional methods is that it is virtually impossible to destroy foam that adheres to the inner surface of the container. In the case of arc discharge, the arc electrode breaks down over time. This makes electrode life short, therefore the arc electrode must be replaced periodically. This replacement operation contaminates the filling space, and if the filling is aseptic, sanitation is negated. The electrode material also causes scattering, and contamination is caused by the scattering as well. Furthermore, the discharge position is unstable, which results in dispersion of the defoaming effect. Particularly in such a moist environment as a filling line, discharge behavior may fluctuate considerably by the subtle difference in the humidity of gas between electrodes.

On the other hand, if a light having high energy is condensed in gas, an electrolytic dissociation phenomenon may occur in the gas at an irradiation point on the light propagation path, whereby pulsed sound waves can be generated. This breakdown induced by condensing laser beams is called "laser induced breakdown" (LIB).

The present inventors have discovered that a laser induced breakdown exhibits a superb defoaming effect, which provided the inventors with "a defoaming method characterized in that a pulsed laser beam is condensed and irradiated onto a gas portion above the liquid surface, so as to generate pulsed sound waves from an illumination point as a sound source, and foam is destroyed by the pulsed sound waves which propagate as spherical waves" (Patent Document 11).

According to this method, the pulsed sound waves cause a strong pressure change from the sound source propagating as spherical waves, destroying foam. Unlike the case of conventional defoaming by irradiating such light as a laser beam, it is unnecessary to irradiate each bubble with a beam, therefore defoaming is accomplished at high-speed in a short time. Since pulsed sound waves propagate all the way to the inner peripheral surface of a container, foam adhering to the inner peripheral surface of the container, of which defoaming has been difficult with conventional methods, can be effectively destroyed. If breakdown for defoaming is generated by condensing pulsed light in a gas portion above a liquid surface, shocks on the liquid surface are less than the case of directly irradiating the laser onto the liquid surface, and liquid drops scattering and adhering to a device, or adhering to a glass member of a laser irradiation hole, can be prevented. As a consequence, this method is advantageous in terms of device sanitation and maintaining optical characteristics.

PRIOR ART DOCUMENTS

Patent Documents

Patent Document 1: Japanese Utility Model Application Publication No. S53-102178
Patent Document 2: Japanese Utility Model Application Publication No. S60-31306
Patent Document 3: Japanese Patent Application Publication No. S63-104620
Patent Document 4: Japanese Patent Application Publication No. S63-252509
Patent Document 5: Japanese Patent Application Publication No. H11-90330
Patent Document 6: Japanese Patent Application Publication No. H7-291395
Patent Document 7: Japanese Patent Application Publication No. H9-328193
Patent Document 8: Japanese Utility Model Application Publication No. S62-90397
Patent Document 9: Japanese Patent Application Publication No. H6-191595
Patent Document 10: Japanese Patent Application Publication No. 2002-520226 Patent Document 11: PCT WO No. 2007-086339 A1

DISCLOSURE OF THE INVENTION

Problems to be Solved by the Invention

However, subsequent research demonstrated that conventional defoaming methods, suggested by the inventors, have the following problems: since a pulsed laser beam is irradiated toward the liquid surface, a long focal distance must be taken in order to prevent optical elements, such as lenses, from being contaminated by steam generated from the liquid surface and by drops of destroyed foam, and this makes it difficult to decrease the focal distance to improve the condensing characteristics of the laser beam. Another problem is that the pulsed sound wave is generated in a free space, and propagates as a spherical wave, which means that only a part of the sound wave can contribute to defoaming, and efficiency is poor. Furthermore the liquid surface is irradiated with the laser beam, and the content could be affected by the high power laser beam.

The present invention is provided to solve the above problems of defoaming techniques previously suggested. An object of the present invention is to provide a defoaming method and defoaming device using laser induced breakdown, and particularly to provide a method for improving the utilization efficiency of a sound wave, a method for improving condensing characteristics of a laser beam, a method for not irradiating a laser beam toward the liquid surface, and a device that implements these methods.

Means for Solving the Problem

As a result of devoted research to solve the above problems, the inventors discovered that the above problems can be solved by causing laser induced breakdown inside an acoustic waveguide, and guiding the sound waves generated by the laser induced breakdown to the liquid surface using this acoustic waveguide. This finding led to the creation of the present invention.

Thus the defoaming method according to the invention that resolves the above problems is characterized in that a pulsed laser beam is condensed and irradiated onto an internal space of an acoustic waveguide, so as to generate pulsed sound waves from an illumination point as a sound source, and foam outside an open end of the acoustic waveguide is destroyed by the pulsed sound waves propagating through the acoustic waveguide. It is preferable that the laser beam is irradiated in a direction approximately perpendicular to the axis of the acoustic waveguide. It is also preferable that a reflecting condensing element is disposed at an end of the laser beam, so as to return the laser beam that passed the illumination point, back to the illumination point.

It is also preferable that acoustic impedance is matched between the acoustic waveguide and the external space, so as to suppress propagation loss of the sound waves at the open end of the acoustic waveguide. The acoustic waveguide may be formed in a bent tube shape so that plasma light at the illumination point cannot be directly seen from the open end. Gas may be supplied into the acoustic waveguide.

A defoaming device according to the present invention to implement this defoaming method is a defoaming device that condenses a pulsed laser beam, and generates pulsed sound waves from an illumination point as a sound source, so as to perform defoaming in use of the pulsed sound waves, this device having in combination: a pulsed laser beam oscillation device; a condensing optical system that condenses a pulsed laser beam oscillated by the pulsed laser beam oscillation device; and an acoustic waveguide that has a laser beam entrance hole through which the pulse laser beam irradiated via the condensing optical system passes and that is disposed so that the pulsed laser beam is condensed in the space inside the waveguide, wherein an open end of the acoustic waveguide is located to face up in a direction perpendicular to the liquid surface of the defoaming object.

In the defoaming device, it is preferable that the laser beam entrance hole of the acoustic waveguide is formed on the peripheral wall of the acoustic waveguide, so that the pulsed laser beam can be irradiated in a direction perpendicular to the axis of the acoustic waveguide. It is preferable that a laser beam passing hole is formed in a position opposite the laser beam entrance hole in the peripheral wall of the acoustic waveguide, and a reflecting condensing element is disposed outside the passing hole of the laser beam, so that the illumination point in the acoustic waveguide is a focal point. An open end of the acoustic waveguide may be formed in a horn shape. The acoustic waveguide is formed in a bent tube shape, so that plasma light at the illumination point cannot be directly seen from the open end. In the defoaming device, a gas inlet may be formed on the peripheral wall of the acoustic waveguide in a position closer to the open end than to the laser beam entrance hole, and a gas supply pipe is connected to the gas inlet to supply gas into the waveguide.

Effect of the Invention

According to the present invention, use of the acoustic waveguide generates an effect of condensing the energy of shock waves, most of which have conventionally been released into free space, to the direction toward the open end. Since the utilization efficiency of energy increases, the illumination point can be more distant from the liquid surface compared with conventional techniques. Thereby fewer restrictions are imposed on the condensing optical system, and a more efficient condensing optical system can be constructed.

The laser beam is irradiated in a direction approximately perpendicular to the axis of the acoustic waveguide, therefore irradiating the laser beam onto the liquid surface can be prevented, and the possibility of the content to be affected by the high power laser can be eliminated. Since the laser beam path and the traveling path of the shock wave can be separated, fewer restrictions are imposed on the condensing optical system, and a condensing optical system with high breakdown efficiency can be constructed.

Furthermore, the reflecting condensing element is disposed at the end of the laser beam, whereby the light which was not used for the laser induced breakdown can be used to strengthen breakdown, which improves efficiency and increases safety.

Furthermore, the acoustic impedance is matched between the acoustic waveguide and the external space, whereby propagation loss of the sound waves at the open end can be suppressed.

Furthermore, the acoustic waveguide is formed to be a bent tube, so that the plasma light of the illumination point cannot be directly seen from the open end, whereby the plasma light is absorbed by the wall surface of the acoustic waveguide and cannot reach the open end, and the possibility of the plasma light to affect the content can be eliminated.

Furthermore, gas is supplied into the acoustic waveguide, whereby entry of outside air through the open end can be prevented. Normally steam is generated from the content which is filled, and the presence of the gas supplied here can prevent contamination caused by this steam entering the acoustic waveguide. It is preferable that the inlet of the gas is located between the illumination point and the open end, and ozone, generated by oxygen in the air that is ionized during laser induced breakdown, to flow out of the open end and enter a container, such as a can, can be prevented.

Figure 1:
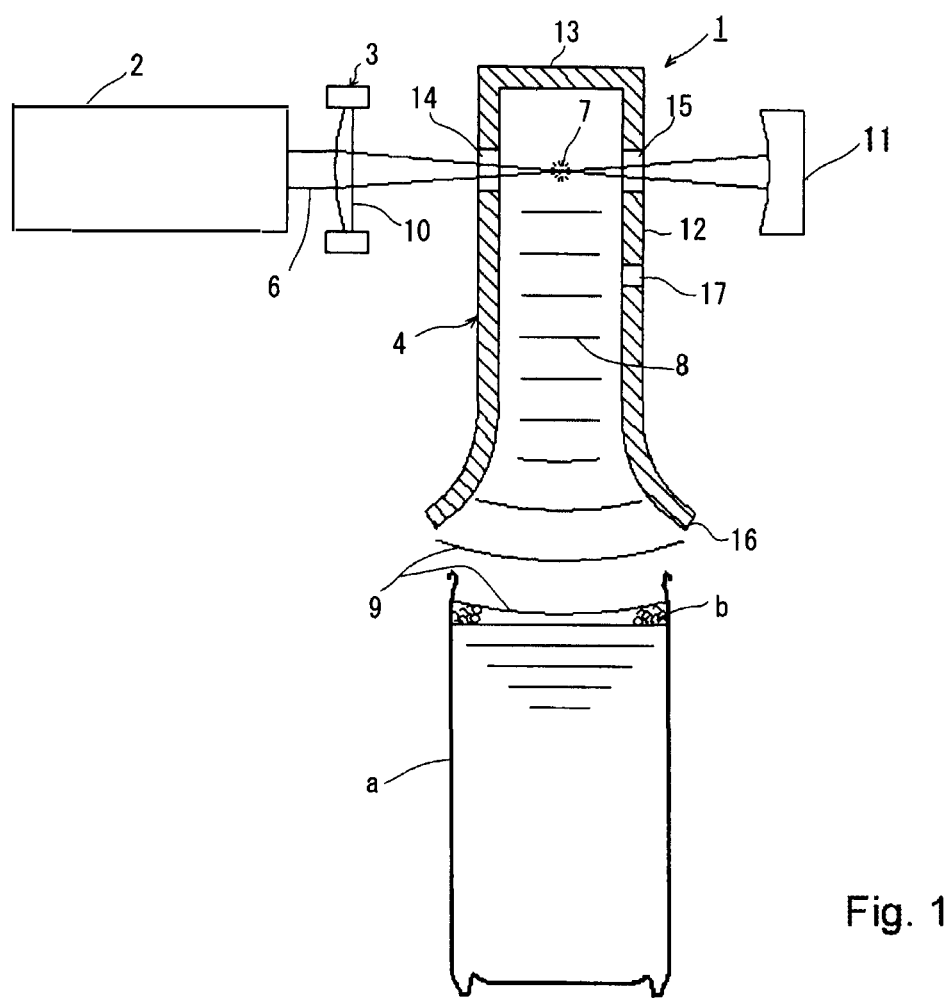
FIG. 1 is a schematic cross-sectional view depicting the defoaming device according to an embodiment of the present invention.

EXPLANATION OF REFERENCE NUMERALS 1, 20, 30, 40, 50, 60: defoaming device
2: pulsed laser beam oscillation device
3: condensing optical system
4, 21, 31, 41, 51, 61: acoustic waveguide
6: light beam
7: illumination point
8: plane wave
9: spherical wave
10: lens
11: reflecting condensing element
12, 22, 32: peripheral wall
13, 52, 62: top wall
14, 63: laser beam entrance hole
15: laser beam passing hole
16: open end
17: gas inlet
a: container
b: foam

BEST MODE FOR CARRYING OUT THE INVENTION

In a defoaming method according to the present embodiment, a pulsed laser beam is condensed and irradiated onto an internal space of an acoustic waveguide so as to generate pulsed sound waves from an illumination point as a sound source, and foam outside an open end of the acoustic waveguide is destroyed by the pulsed sound waves propagating through the acoustic waveguide, and FIG. 1 schematically illustrates the basic structure of defoaming principle of the defoaming method.

In FIG. 1, the reference numeral 1 stands for a defoaming device according to this embodiment, which comprises a pulsed laser beam oscillation device 2 that generates a pulsed light beam, a condensing optical system 3 that condenses the pulsed laser beam oscillated by the pulsed laser beam oscillation device, and an acoustic waveguide 4, and in this configuration, an open end 16 of the acoustic waveguide is located above the liquid surface of a defoaming object facing the liquid surface in the vertical direction. In the embodiment illustrated in FIG. 1, on the assembly line to fill content into a container a and sealing the container a, the acoustic waveguide 4 is vertically disposed above the conveyer which transports the filled container a to a sealing machine, or above the position where the unsealed container passes in the sealing machine, and the pulsed laser beam oscillation device 2 is disposed so that the pulsed laser beam is irradiated in a direction approximately perpendicular to the axis of the acoustic waveguide 4.

The pulsed laser beam oscillation device is preferred such that the pulsed laser beam capable of instantaneously emitting energy accumulated in the laser medium as optical pulses is oscillated. Examples of pulsed lasers are: a Q-switching YAG laser, a YVO4 laser, a YLF laser and a femtosecond laser, such as a TiS laser. These pulse lasers have a repetition period from several Hz to several tens of kHz, and release energy accumulated during the repetition period within a very short interval from several femtoseconds (fs) to several tens of nanoseconds (ns). Therefore a high peak power can be efficiently obtained from low input energy. Other pulsed laser beam oscillation devices which oscillate various laser beams, such as a $CO_2$ laser, an excimer laser and a semiconductor laser, can also be used as this pulsed laser beam oscillation device. Further, higher harmonic light generated by the wave length conversion element from the basic wave of these laser beams can be used. These pulse laser beams include the Continuous-Wave (CW) pulsed laser beams, and in this case, the pulsed light can also be generated using a light control member, such as a shutter.

The condensing optical system 3 of this embodiment is comprised of a lens 10 that is disposed between the pulsed laser beam oscillation device 2 and the acoustic waveguide 4, and a later described reflecting condensing element 11 that is disposed on the opposite side of the acoustic waveguide, but the configuration is not limited to this.

An element combining a convex lens and a plane mirror and other arbitrary elements can be used for the reflecting condensing element 11, instead of the illustrated concave mirror.

As shown in FIG. 1, the lens 10 may be formed separately from the pulsed laser beam oscillation device, but may be integrated with the pulsed laser beam oscillation device. The intensity of the pulsed sound wave generated by the laser induced breakdown changes depending on the optical power density per unit surface area in the illumination point. Hence the laser induced breakdown can be efficiently generated from the same laser output by optimizing the condensing optical system 3, so as to improve the condensing characteristics. Generally to improve the condensing characteristics, the larger the numerical aperture (NA) of the lens is better. This means that the condensing characteristics improves as the lens has a larger numerical aperture and shorter focal distance. However as the focal distance decreases, the distance to the liquid surface decreases, and the lens can be more easily contaminated by scattered liquid drops. In order to improve the condensing characteristics, it is preferred to align the wave fronts. Therefore it is preferred that a combined lens (aplanatic lens), in which aberrations are corrected by combining a plurality of lenses or a non-spherical lens designed by matching the lens surface to a wave front shape, be used.

In the case of the conventional methods suggested above, the laser beam is condensed in the free space, and the generated pulsed wave propagates as a spherical wave, hence the intensity of a sound wave rapidly attenuates. Because of this, the illumination point cannot be set sufficiently high above the liquid surface, and the focal distance cannot be set sufficiently short. To solve this problem, the present invention uses the acoustic waveguide 4, and since a shock wave travels as a plane wave inside the acoustic waveguide 4, the energy of the shock wave can be transferred without attenuation, for a relatively long distance compared with the case of a spherical wave. Thereby the height of the illumination point from the liquid surface of an illumination point 7 may be increased. As a result, condensing characteristics can be improved using a lens having a short focal distance.

As FIG. 1 illustrates, according to the acoustic waveguide 4 of this embodiment, a laser beam entrance hole 14 is formed on a peripheral wall 12 in a position closer to a top wall 13, so that the pulsed laser beam can be irradiated in a direction perpendicular to the axis of the acoustic waveguide. A laser beam passing hole 15 is formed on the peripheral wall in an opposite position of the laser beam entrance hole 14 on the same optical path. To improve energy efficiency, the laser beam passing hole 15 is for guiding the end of the optical path of the laser beam irradiated to the acoustic waveguide, to the reflecting condensing element 11 which is disposed outside the acoustic waveguide, so that the laser beam is reflected and returned to the illumination point. The laser beam passing hole 15, however, is not absolutely necessary. The reflecting condensing element 11 is disposed in such a way that the focal point thereof matches the illumination point of the pulsed laser beam oscillation device in the acoustic waveguide.

If the reflecting condensing element can be installed inside the acoustic waveguide, the laser beam passing hole 15 need not be formed. A gas inlet 17 is formed, as mentioned later, on the peripheral wall of the acoustic waveguide. The gas inlet is for supplying gas from the outside into the acoustic waveguide in order to prevent ozone, generated by breakdown, from flowing out of the open end and entering into the container, and is preferably located between the illumination point and the open end. In this embodiment, the open end 16 of the acoustic waveguide 4 is formed in a horn shape, so as to suppress propagation loss of the sound wave at the open end.

The length of the acoustic waveguide 4 is not especially restricted, so length can be long or short. The position of the illumination point (irradiation point) 7 in the acoustic waveguide may be any place in the axis direction and in the radius direction, but it is preferable to condense the beam on the center axis in terms of converting the wave fronts of the shock wave into a plane wave. The end of the acoustic waveguide, at the opposite side of the opening end, can have any shape, but if the shape is appropriate, traveling of the shock wave inside the acoustic waveguide can be enhanced.

In the defoaming device of this embodiment configured as described above, a light beam 6 of the pulsed laser beam oscillated by the pulsed laser beam oscillation device 2 is condensed by the condensing optical system 3, passes through the laser entrance hole 14 of the acoustic waveguide in a direction approximately perpendicular to the axis of the acoustic waveguide, and irradiates onto the illumination point 7, which is in the central position in the cross-section of the acoustic waveguide. If a strong pulsed light oscillated by the light source is irradiated onto the gas, an impact pressure pulse is generated from the illumination point 7 at the moment of irradiation due to a laser induced breakdown phenomena, whereby the pulsed sound wave can be generated. The generated pulsed sound wave propagates through the acoustic waveguide as a plane wave 8 as schematically illustrated in FIG. 1, then propagates beyond the open end of the acoustic waveguide as a spherical wave 9, and sequentially destroys foam b on the liquid surface of the container a at high-speed. Thus according to this embodiment, the pulsed sound wave generated in the acoustic waveguide propagates down the acoustic waveguide as a plane wave, and then propagates beyond the open end as a spherical wave, therefore most of the energy of the impact wave conventionally released into the free space can be concentrated in the open end direction.

Furthermore, according to this embodiment, the laser beam is irradiated in a direction approximately perpendicular to the axis of the acoustic waveguide, therefore irradiating the laser beam onto the liquid surface can be prevented, and the possibility that the content to be affected by the high power laser can be eliminated. Since the laser beam path and the traveling path of the shock wave can be separated, fewer restrictions are imposed on the condensing optical system, and the condensing optical system with high breakdown efficiency can be constructed. Furthermore, the end of the pulsed laser beam path can be returned to the illumination point by reflecting the laser beam by the reflecting condensing element 11. Thereby the light which was not used for the laser inducted breakdown, out of the irradiated laser beam, can be used to strengthen breakdown, which improves efficiency and increases safety. Furthermore, gas (e.g. such inactive gas as nitrogen, and air) is supplied into the acoustic waveguide through the gas inlet 17, whereby steam generated from the liquid which is filled in the container, for example, and enters and contaminates the acoustic waveguide, can be prevented. The inlet of the gas is installed between the illumination point and the open end of the acoustic waveguide, then ozone, generated by oxygen in the air that is ionized during laser induced breakdown, to flow out of the open end and enter a container, can be prevented.

Figure 2:
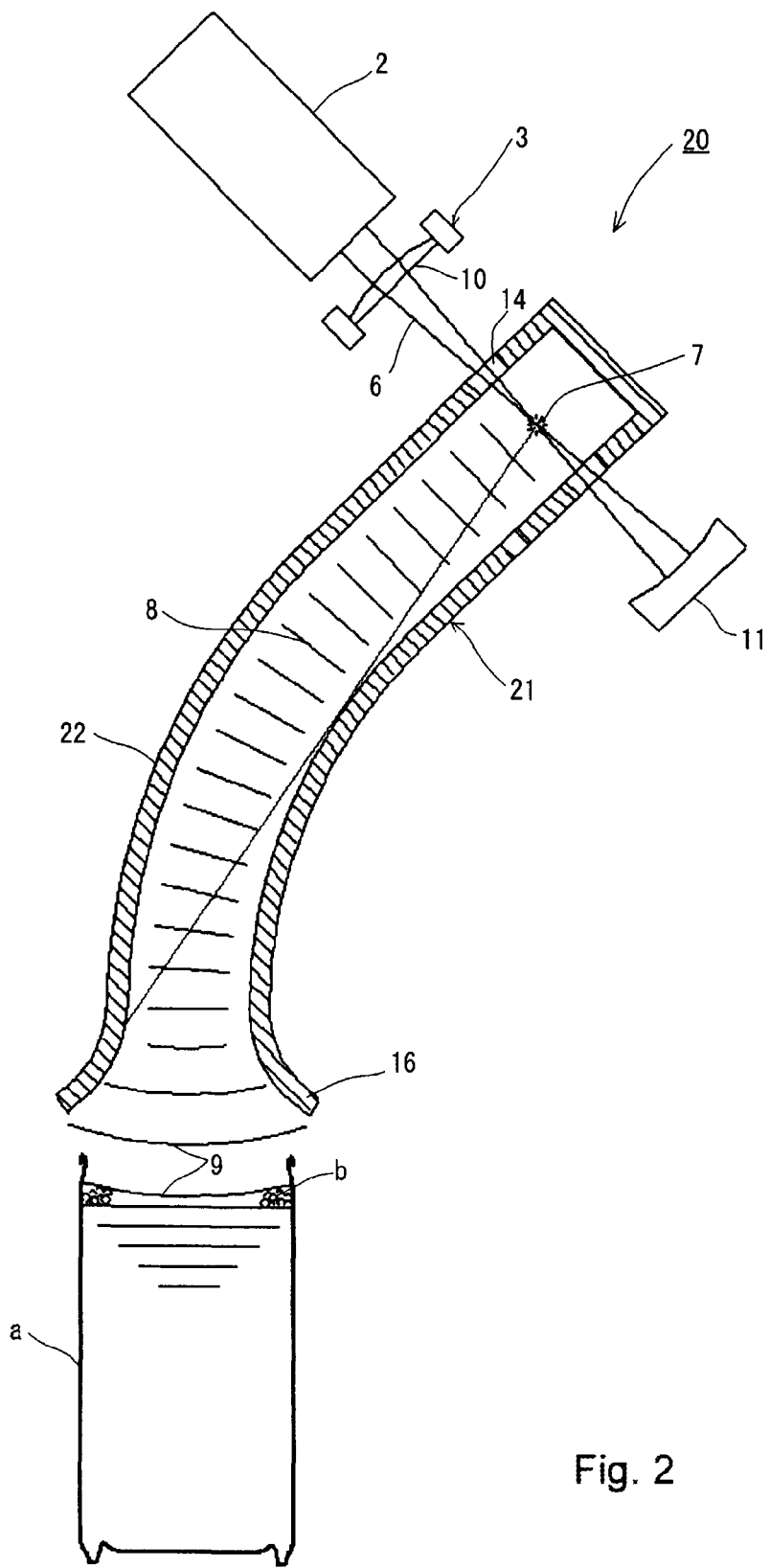
FIG. 2 is a schematic cross-sectional view depicting the defoaming device according to another embodiment of the present invention.

FIG. 2 is a schematic cross-sectional view depicting a defoaming device 20 according to another embodiment of the present invention. A composing element the same as the defoaming device of the above mentioned embodiment is denoted with a same reference numeral for which description is omitted, and only differences are described. This is the same for other embodiments described herein below.

The deforming device 20 of the embodiment illustrated in FIG. 2 is characterized in that an acoustic waveguide 21 has a bent shape, as illustrated. The acoustic waveguide 21 is bent in such a way that the plasma light generated in the illumination point 7 by the laser induced breakdown cannot be seen directly from the open end. Thereby the plasma light is absorbed by the wall surface of the acoustic waveguide, and does not reach the open end.

Figure 3:
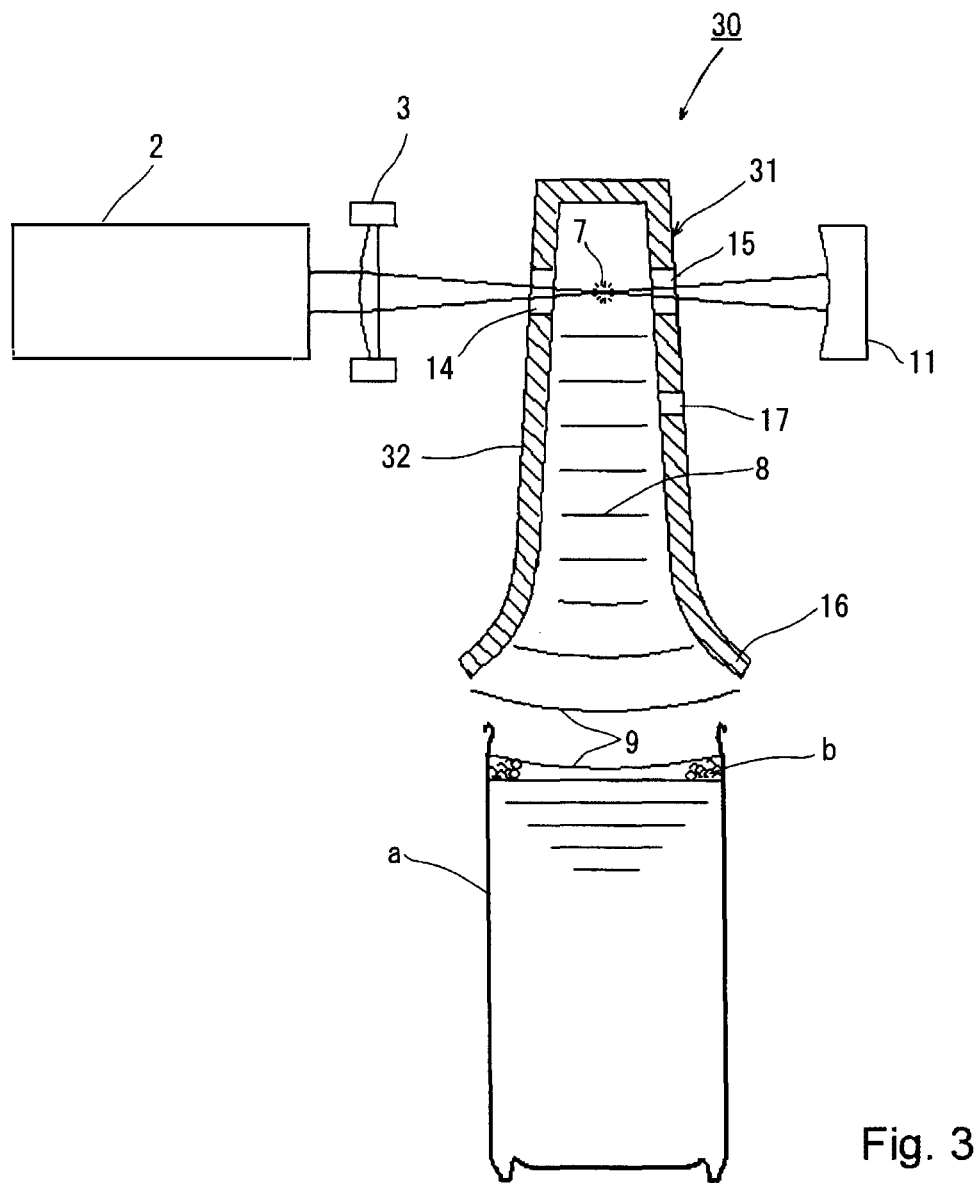
FIG. 3 is a schematic cross-sectional view depicting the defoaming device according to still another embodiment of the present invention.

FIG. 3 is a schematic cross-sectional view depicting a defoaming device 30 according to still another embodiment of the present invention.

The defoaming device of this embodiment is characterized in that the cross-sectional shape of the peripheral wall 32 of the acoustic waveguide 31 in the axis direction is approximately conical, and the open end is formed in a horn shape. If the cross-sectional shape of the acoustic waveguide in the axis direction is approximately conical, impedance of the open end is matched, and high pulsed sound waves can be generated.

Figure 4:
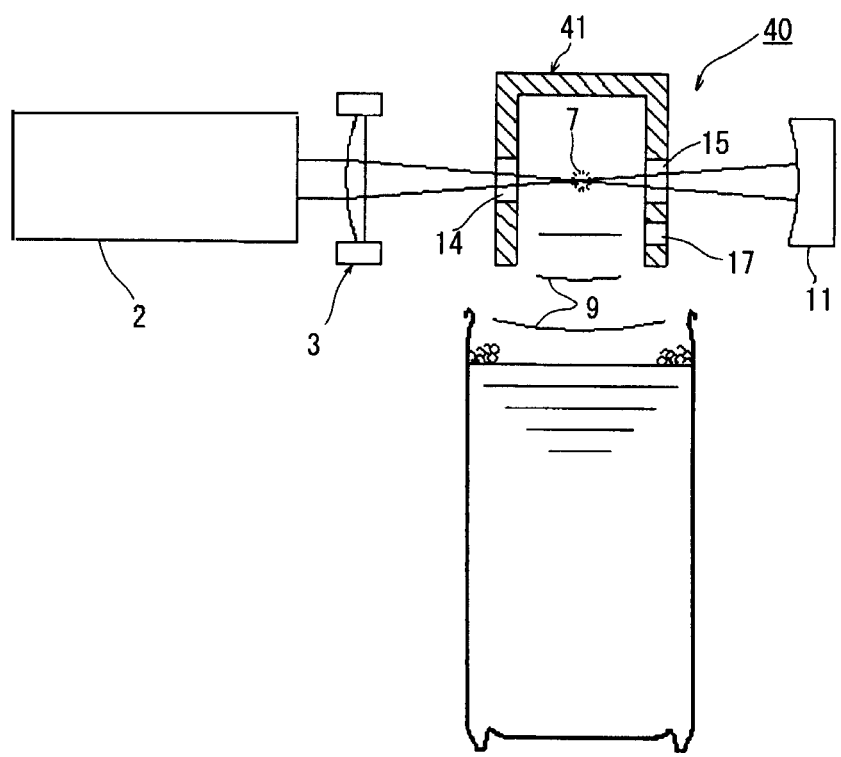
FIG. 4 is a schematic cross-sectional view depicting the defoaming device according to still another embodiment of the present invention.

FIG. 4 is a schematic cross-sectional view depicting a defoaming device 40 according to still another embodiment of the present invention. This embodiment is characterized in that the acoustic waveguide 41 has a simple cylindrical shape, and the length thereof is short.

Figure 5:
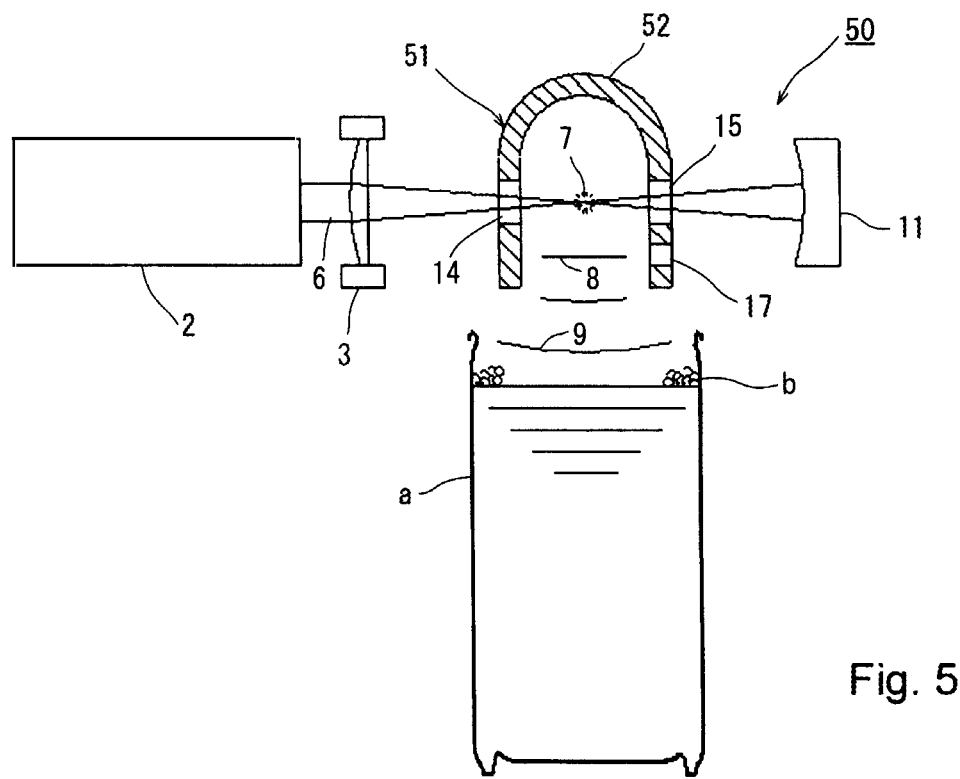
FIG. 5 is a schematic cross-sectional view depicting the defoaming device according to still another embodiment of the present invention.

FIG. 5 is a schematic cross-sectional view depicting a defoaming device 50 according to still another embodiment of the present invention. This embodiment is characterised in that the top wall 52 of the acoustic waveguide 51 is formed as a dome. If the open end of the acoustic waveguide and the end on the opposite side are formed to be a dome, as in this embodiment, the generation of plane waves can be enhanced.

Figure 6:
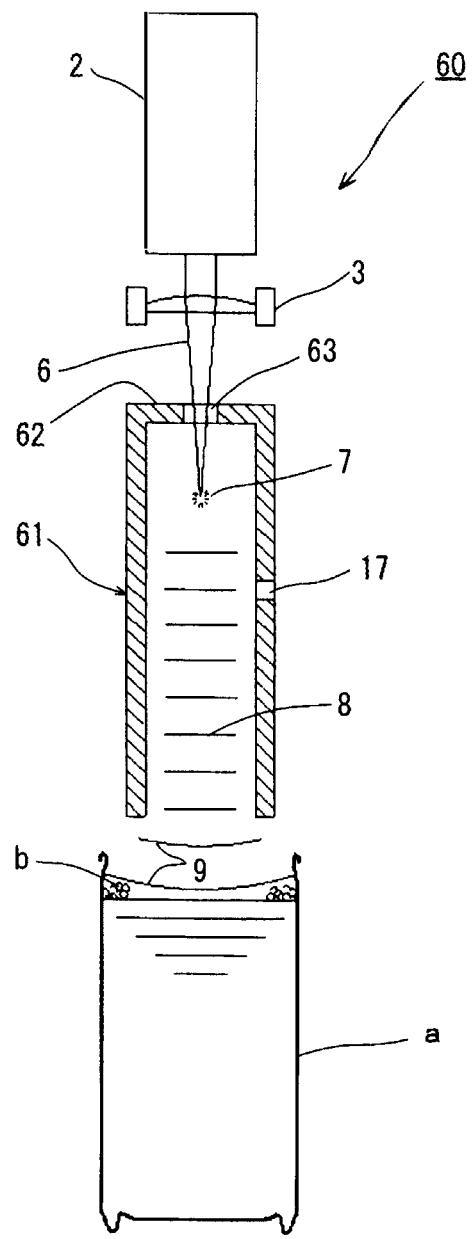
FIG. 6 is a schematic cross-sectional view depicting the defoaming device according to yet another embodiment of the present invention.

FIG. 6 is a schematic cross-sectional view depicting a defoaming device 60 according to still another embodiment of the present invention. In each of the embodiments described above, the laser beam oscillated from the pulsed laser beam oscillation device is irradiated in a direction perpendicular to the axis of the acoustic waveguide, but in this embodiment, the pulsed laser beam oscillation device is disposed so that the laser beam is irradiated parallel with the axis of the acoustic waveguide. Therefore according to this embodiment, the laser beam entrance hole 63 is disposed on the top wall 62 of the acoustic waveguide 61. It is preferable that the laser beam is irradiated in a direction perpendicular to the axis of the acoustic waveguide for the above mentioned reasons, but if there are restrictions on the installation location of the defoaming device, and if the pulsed laser beam oscillation device cannot be installed horizontally, the pulsed laser beam oscillation device can be installed along the same axis as the acoustic waveguide as described in this embodiment.

Various embodiments of the defoaming method and the defoaming device of the present invention have been described, but the present invention is not limited to these embodiments, but various methods can be used without restricting specific means to be used only if foam can be destroyed instantaneously using the pulsed sound waves generated in the acoustic waveguide.

The present invention can be applied to a PET bottle, a bottle can and other narrow mouth containers which have an open end that is narrower than the liquid surface where foam is generated. The repetition period and the pulse width of the pulsed laser beam are generally short, so the container can be handled as in substantially a stopped state, even if the container is actually in-transport. The pulsed sound wave may be generated only once for one container, or may be generated for a plurality of times with an arbitrary repetition period. A single light beam may be irradiated or a plurality of light beams may be irradiated. A plurality of pulsed sound waves may be generated by scanning the light beam, using such an optical element as a galvano-mirror.

INDUSTRIAL APPLICABILITY

The defoaming method and the defoaming device in accordance with the present invention is suitable for destroying foam generated when a container such as a can, a PET bottle, a bottle can, a glass bottle and a pouch is filled with a liquid such as a beverage, but the present invention is not limited to the case of packaging in containers, and can also be used for destroying foam generated in various food production processes such as a tofu production process, or as defoaming means in a variety of industrial fields.

The invention claimed is:
1. A defoaming method comprising:
   irradiating a pulse laser beam to a condenser;
   condensing the pulsed laser beam and irradiating the laser beam through a laser beam entrance hole in an acoustic waveguide into an internal space of the acoustic waveguide so as to generate pulsed sound waves originating from an illumination point within the acoustic waveguide where the laser beam is focused as an originating sound source;
   propagating the pulsed sound waves in a direction from a closed end of the wave guide toward an open end of the wave guide;
   destroying foam on a surface of a liquid located directly below the open end of the acoustic waveguide by the pulsed sound waves propagating through the acoustic waveguide.
2. The defoaming method according to claim 1, characterized in that
   the laser beam is irradiated in a direction approximately perpendicular to the axis of the acoustic waveguide.
3. The defoaming method according to claim 2, characterized in that
   a reflecting condensing element is disposed at an end of the laser beam, so as to return the laser beam that has passed the illumination point back to the illumination point.
4. The defoaming method according to claim 1, characterized in that
   acoustic impedance is matched between the acoustic waveguide and an external space, so as to suppress propagation loss of the sound waves at the open end of the acoustic waveguide.
5. The defoaming method according to claim 1, characterized in that
   the acoustic waveguide is formed in a bent tube shape, so that plasma light at the illumination point cannot be directly seen from the open end.

6. The defoaming method according to claim 1, characterized in that
gas is supplied into the acoustic waveguide.

7. A defoaming device that condenses a pulsed laser beam and generates pulsed sound waves from an illumination point as a sound source,
the device comprising in combination:
a pulsed laser beam oscillation device;
a condensing optical system that condenses the pulsed laser beam oscillated by the pulsed laser beam oscillation device; and
an acoustic waveguide that has a laser beam entrance hole through which the pulsed laser beam irradiates via the condensing optical system, and configured in such a way that the illumination point where the laser beam is focused is located inside the acoustic waveguide, the acoustic waveguide having a closed end and an open end and configured in such a way that the pulsed sound waves propagate from the illumination point as originating the sound source in a direction from the closed end to the open end,
the open end of the acoustic waveguide being configured so as to emit the pulsed sound waves to a liquid surface having foam thereon located directly below the open end of the acoustic waveguide and thereby defoaming the liquid surface.

8. The defoaming device according to claim 7, characterized in that
the laser beam entrance hole of the acoustic waveguide is formed on a peripheral wall of the acoustic waveguide so that the pulsed laser beam can be irradiated in a direction perpendicular to the axis of the acoustic waveguide.

9. The defoaming device according to claim 8, further comprising
a laser beam passing hole on the peripheral wall of the acoustic waveguide in a position opposite the laser beam entrance hole, and a reflecting condensing element disposed outside the passing hole of the laser beam so that the illumination point in the acoustic waveguide is a focal point.

10. The defoaming device according to claim 7, wherein
the open end of the acoustic waveguide is a horn shape.

11. The defoaming device according to claim 7, wherein
the acoustic waveguide has a bent tube shape configured so that plasma light at the illumination point cannot be directly seen from the open end.

12. The defoaming device according to claim 7, further comprising
a gas inlet on the peripheral wall of the acoustic waveguide in a position closer to the open end than the laser beam entrance hole, and a gas supply pipe connected to the gas inlet.

* * * * *